(12) United States Patent
Chubbuck (10) Patent No.: US 8,888,115 B2
(45) Date of Patent: Nov. 18, 2014

(54) BICYCLE SEAT TUBE

(75) Inventor: Kyle L. Chubbuck, San Jose, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 580 days.

(21) Appl. No.: 13/082,196

(22) Filed: Apr. 7, 2011

(65) Prior Publication Data

US 2011/0248470 A1    Oct. 13, 2011

Related U.S. Application Data

(60) Provisional application No. 61/321,796, filed on Apr. 7, 2010.

(51) Int. Cl.
*B62K 19/36* (2006.01)
*B62J 1/02* (2006.01)

(52) U.S. Cl.
CPC . *B62K 19/36* (2013.01); *B62J 1/02* (2013.01); *B62K 2201/02* (2013.01)
USPC ............ 280/220; 267/132; 280/275; 280/283

(58) Field of Classification Search
CPC ....... B62K 19/36; B62K 2201/02; B62J 1/04; F16F 1/38; F16F 1/3863
USPC ........... 280/275, 283, 220, 281.1, 274, 288.4, 280/278, 287; 24/515, 516, 271; 297/216.13, 215.14, 195.1, 215; 703/374.1, 104; 267/131, 132, 133; 248/141
See application file for complete search history.

(56) References Cited

U.S. PATENT DOCUMENTS

| | | | |
|---|---|---|---|
| 373,303 A | 11/1887 | Patzer | |
| 390,381 A | 10/1888 | Luetke | |
| 390,406 A | 10/1888 | Sittig | |
| 510,993 A | 12/1893 | Riess | |
| 617,831 A | 1/1899 | Irish | |
| 746,279 A * | 12/1903 | Brougham | 280/283 |
| 2,495,859 A * | 1/1950 | Mennesson | 280/281.1 |

(Continued)

FOREIGN PATENT DOCUMENTS

| | | |
|---|---|---|
| DE | 9013266 | 11/1990 |
| DE | 9405449 | 9/1994 |

(Continued)

OTHER PUBLICATIONS

International Search Report and Written Opinion for International Application No. PCT/US2011/030393 mailed Jun. 28, 2011.

(Continued)

*Primary Examiner* — Anne Marie Boehler
(74) *Attorney, Agent, or Firm* — Knobbe Martens Olson & Bear LLP (57) ABSTRACT

A bicycle seat tube assembly and seat post can be arranged to reduce vibrations that originate at the bicycle wheel and are transmitted to the rider of the bicycle. Desirably, a saddle is configured to be supported by a seat post which connects to a bicycle frame at the seat tube assembly. An open cavity can be formed between the seat tube assembly and the seat post. The open cavity can be configured to allow the system to act as a spring. Further, spring stiffness can be adjusted to reduce vibrations and increase damping.

29 Claims, 6 Drawing Sheets

(56) References Cited

U.S. PATENT DOCUMENTS

| | | |
|---|---|---|
| 2,644,504 A | 7/1953 | Vick |
| 2,710,207 A * | 6/1955 | Mueller .................... 403/373 |
| 2,770,479 A * | 11/1956 | Hilber .................... 403/374.1 |
| 2,780,277 A | 2/1957 | Ries et al. |
| 2,909,212 A | 10/1959 | Scherer |
| 3,228,647 A | 1/1966 | Musianowycz |
| 3,327,985 A | 6/1967 | Levit et al. |
| 3,560,032 A | 2/1971 | Cohen |
| 3,861,740 A | 1/1975 | Tajima et al. |
| 3,989,263 A | 11/1976 | Stuck et al. |
| 4,023,649 A | 5/1977 | Wood |
| 4,111,575 A * | 9/1978 | Hoshino .................... 403/104 |
| 4,113,221 A | 9/1978 | Wehner |
| 4,113,222 A | 9/1978 | Frinzel |
| 4,150,851 A | 4/1979 | Cienfuegos |
| 4,165,854 A | 8/1979 | Duly |
| 4,245,826 A | 1/1981 | Wirges |
| 4,261,540 A | 4/1981 | Baker et al. |
| 4,455,010 A | 6/1984 | Butler |
| 4,640,484 A | 2/1987 | Lamond |
| 4,674,796 A | 6/1987 | Weinich et al. |
| 4,706,916 A | 11/1987 | Cullmann et al. |
| 4,772,069 A | 9/1988 | Szymski |
| 4,789,176 A | 12/1988 | Carroll |
| 4,807,856 A | 2/1989 | Teckenbrock |
| 4,826,192 A * | 5/1989 | Borromeo .................. 280/281.1 |
| 4,850,733 A | 7/1989 | Shook |
| 4,856,801 A | 8/1989 | Hollingsworth |
| 4,872,696 A | 10/1989 | Gill |
| 4,919,378 A | 4/1990 | Iwasaki et al. |
| 5,036,873 A | 8/1991 | Clayton |
| 5,044,592 A | 9/1991 | Cienfuegos |
| 5,054,802 A * | 10/1991 | Smith .................... 280/279 |
| 5,149,034 A | 9/1992 | Ganaja |
| 5,236,169 A | 8/1993 | Johnsen |
| 5,240,219 A | 8/1993 | Stonehouse |
| 5,324,058 A | 6/1994 | Massaro |
| 5,351,980 A * | 10/1994 | Huang .................... 280/281.1 |
| 5,458,020 A | 10/1995 | Wang |
| 5,459,908 A | 10/1995 | Chen |
| 5,460,357 A | 10/1995 | Stewart |
| 5,500,981 A | 3/1996 | Ho |
| 5,513,895 A | 5/1996 | Olson et al. |
| 5,584,097 A | 12/1996 | Lu |
| 5,586,830 A | 12/1996 | Wanek et al. |
| 5,609,349 A | 3/1997 | Buckmiller et al. |
| 5,620,070 A | 4/1997 | Wang |
| 5,628,088 A | 5/1997 | Chen |
| 5,657,958 A * | 8/1997 | McLaughlin et al. ........ 248/632 |
| 5,683,200 A | 11/1997 | Levy |
| 5,704,626 A | 1/1998 | Kesinger |
| 5,713,555 A | 2/1998 | Zurfluh et al. |
| 5,727,898 A | 3/1998 | Lu |
| 5,729,866 A | 3/1998 | Chg |
| 5,826,935 A | 10/1998 | DeFreitas |
| 5,829,733 A | 11/1998 | Becker |
| 5,899,479 A | 5/1999 | Schroder |
| 5,911,263 A | 6/1999 | Wu |
| 6,036,164 A | 3/2000 | Martins |
| 6,070,895 A | 6/2000 | Newman et al. |
| 6,202,971 B1 | 3/2001 | Duncan |
| 6,206,396 B1 | 3/2001 | Smith |
| 6,220,581 B1 | 4/2001 | Mueller |
| 6,276,756 B1 | 8/2001 | Cho et al. |
| 6,354,557 B1 | 3/2002 | Walsh |
| 6,364,292 B1 | 4/2002 | Chen et al. |
| 6,478,278 B1 | 11/2002 | Duncan |
| 6,543,754 B2 | 4/2003 | Ogura |
| 6,557,878 B2 * | 5/2003 | Chen .................... 280/226.1 |
| 6,585,215 B2 | 7/2003 | Duncan |
| 6,799,773 B2 * | 10/2004 | Kao .................... 280/281.1 |
| 6,827,397 B1 | 12/2004 | Driver |
| 6,848,701 B2 | 2/2005 | Sinyard et al. |
| 6,913,560 B2 | 7/2005 | Ryan et al. |
| 7,017,928 B2 | 3/2006 | Felsl et al. |
| 7,025,367 B2 | 4/2006 | McKinnon |
| 7,025,522 B2 | 4/2006 | Sicz et al. |
| 7,083,180 B2 | 8/2006 | Turner |
| 7,267,635 B2 | 9/2007 | Ryan et al. |
| 7,306,206 B2 | 12/2007 | Turner |
| 7,370,877 B2 | 5/2008 | Refsum |
| 7,374,140 B2 | 5/2008 | Crain et al. |
| 7,422,224 B2 | 9/2008 | Sicz et al. |
| 7,673,936 B2 | 3/2010 | Hsu |
| 7,708,251 B2 | 5/2010 | Watt et al. |
| 7,845,602 B1 | 12/2010 | Young et al. |
| 2001/0015400 A1 | 8/2001 | Langham |
| 2002/0185581 A1 | 12/2002 | Trask |
| 2004/0036327 A1 | 2/2004 | Barandiaran Salaberria |
| 2005/0248118 A1 * | 11/2005 | D'Aluisio et al. ........... 280/275 |
| 2006/0175792 A1 | 8/2006 | Sicz et al. |
| 2007/0215781 A1 | 9/2007 | Watt |
| 2009/0192673 A1 | 7/2009 | Song et al. |
| 2010/0254751 A1 | 10/2010 | McMillan, III |
| 2010/0314917 A1 | 12/2010 | Hsieh |

FOREIGN PATENT DOCUMENTS

| | | |
|---|---|---|
| DE | 4401980 | 7/1995 |
| DE | 102008059894 B4 | 11/2010 |
| DE | 202010012738 U1 | 12/2010 |
| EP | 0148979 | 7/1985 |
| EP | 0528069 | 2/1993 |
| EP | 1092621 | 4/2001 |
| EP | 2052957 | 4/2009 |
| FR | 1178244 | 5/1959 |
| FR | 2952031 | 5/2011 |
| GB | 2116128 | 9/1983 |
| JP | 04362482 | 12/1992 |
| JP | 2007-137265 * | 6/2007 |
| WO | WO 97/20725 | 6/1997 |
| WO | WO 2010/063535 | 6/2010 |

OTHER PUBLICATIONS

BikeRadar, Post Moderne Cushy SL Review, http://www.bikeradar.com/gear/category/components/seat-post-seat-pin/product/review-post-moderne-moderne-cushy-sl-09-33994, dated Feb. 7, 2009.

BikeRadar, Cane Creek Thudbuster LT Suspension Seatpost Review, http://www.bikeradar.com/gear/category/components/seat-post-seat-pin/product/thudbuster-It-10308, dated Feb. 9, 2009.

BikeRadar, White Brothers Road Air Seatpost Review, http://www.bikeradar.com/gear/category/components/seat-post-seat-pin/product/review-white-brothers-road-air-seatpost-10646, dated Feb. 1, 2006.

BikeRadar, White Brothers AP-1 Review, http://www.bikeradar.com/gear/category/components/seat-post-seat-pin/product/review-white-brothers-ap-1-10304#review_body, dated Sep. 19, 2007.

International Search Report for International Application No. PCT/US2009/044199 mailed Oct. 22, 2009.

* cited by examiner

BICYCLE SEAT TUBE

CROSS-REFERENCE TO RELATED APPLICATIONS

This application claims the benefit under 35 U.S.C. §119 (e) of U.S. Provisional Application No. 61/321,796 filed Apr. 7, 2010, titled BICYCLE SEAT TUBE, the entire contents of which is hereby incorporated by reference herein and made a part of this specification.

BACKGROUND OF THE INVENTION

1. Field of the Invention

The present invention generally relates to bicycles. More particularly, the present invention relates to a seat tube configured to reduce vibrations transmitted to a rider of the bicycle.

2. Description of the Related Art

Bicycle riding and racing often takes place on less than ideal terrain conditions. For example, bicycle touring and racing may often take place on country roads, which may be unpaved or where the pavement may be rough and irregular, even when new. In more populated areas, a significant portion of paved roads may be damaged and in need of repair. When traversed by the bicycle, these irregular surfaces transmit vibrations to the bicycle. Furthermore, the surface of even relatively new pavement, while acceptable for motor vehicles, may be rough enough to transmit significant vibration to a bicycle. Accordingly, most bicyclists spend at least a significant portion of their riding time traversing rough or irregular surfaces. Vibrations induced by such terrain, if not sufficiently dampened, may be transmitted to the rider of the bicycle. When transmitted to the rider, these vibrations often cause discomfort and fatigue.

Several methods for damping terrain-induced vibrations have been utilized. For example, the bicycle may be equipped with front and/or rear suspension assemblies, which permit the suspended wheel to move against a biasing force relative to the bicycle frame. Although highly favored in some applications, such as bicycles intended primarily for off-road use, such suspension assemblies have generally been unsuccessful in connection with bicycles primarily intended for use on paved surfaces (i.e., road bicycles), where low weight and aerodynamics are considered highly important. Furthermore, such suspension assemblies are intended to absorb large bumps and may not be effective at isolating vibrations due to inherent friction within the assembly, which may prevent movement of the suspension assembly in response to small forces.

In road bicycle applications, it has recently become popular to utilize materials having improved damping properties in comparison to metals to form a portion or all of the bicycle between the wheels and the rider. For example, a composite material of carbon fiber fabric within a resin matrix ("carbon fiber") is often used in an attempt to isolate road-induced vibrations from the rider of the bicycle. In some instances, the entire frame of the bicycle may be comprised of a carbon fiber material.

Such an arrangement has been more successful in isolating terrain-induced vibrations from reaching the rider of the bicycle in comparison with bicycle frames and components comprised entirely of metal. However, although carbon fiber is lightweight and exhibits improved vibration damping characteristics in comparison to metal, a significant amount of vibration may nonetheless be transferred through components made from carbon fiber.

SUMMARY OF THE INVENTION

Accordingly, a need exists for a cost-effective method of reducing vibrations from being transmitted from the wheels of a bicycle to the rider of the bicycle. Some embodiments of a seat tube assembly include a cavity between the walls of the seat tube assembly and the seat post. The seat post assembly can also include a vibration damping member. Preferably, the vibration damping member is constructed from an elastomeric material. The seat tube assembly can be constructed from a carbon fiber material and/or a metal material, such as steel, aluminum, and titanium.

In some embodiments, a bicycle can have a main frame with a top tube, a head tube, a down tube, and a seat tube. The bicycle may also include a seat post having first and second ends, the first end configured to connect to a saddle and the second end configured for insertion into the seat tube. A clamp can secure the seat post to the seat tube. The seat tube can include an open cavity where the open cavity defines a space between an outer wall of the seat post and an inner wall of the seat tube. The outer wall can be substantially parallel to the inner wall. The seat tube can be configured to allow the seat post to rotate about the clamp to thereby decrease vibrations transmitted to a rider of the bicycle.

In further embodiments, the bicycle may include a damping material within the open cavity. The damping material can be a solid piece of elastomeric material and occupy part of or substantially the entire volume of the open cavity. In some embodiments, the seat tube can further include a first tube and a second tube, where the second tube is configured to fit within the first tube and between the first tube and the seat post.

Some embodiments can include a bicycle frameset or a bicycle module that can include a top tube, a down tube, a head tube connected to the top tube and the down tube and a seat tube connected to the top tube and the down tube. They may further include a fork assembly configured for insertion into the head tube and a seat post configured to connect to a saddle at a first end and a second end configured for insertion into the seat tube. A clamp can secure the seat post within the seat tube. The seat tube can be configured to secure said seat post substantially only at the clamp so that the seat post is able to rotate about the clamping location within a space between the seat post and the seat tube and within the seat tube. In some embodiments, there may be a damping member within the seat tube and between the seat tube and the seat post.

A bicycle frame according to some embodiment can include a head tube, a seat tube configured to receive a seat post connected to a saddle, a connecting tube to connect the head tube and the seat tube, and a clamp configured to secure the seat post within the seat tube. When assembled and clamped, the seat tube and seat post can be configured such that there is a clearance between an inside surface of the seat tube and an outside surface of the seat post such that the seat post is allowed to rotate about the clamp and within the seat tube.

BRIEF DESCRIPTION OF THE DRAWINGS

These and other features, aspects and advantages of the present invention are described with reference to drawings of a preferred embodiment, which is intended to illustrate, and not to limit, the present invention.

DETAILED DESCRIPTION OF THE PREFERRED EMBODIMENT

Figure 1:
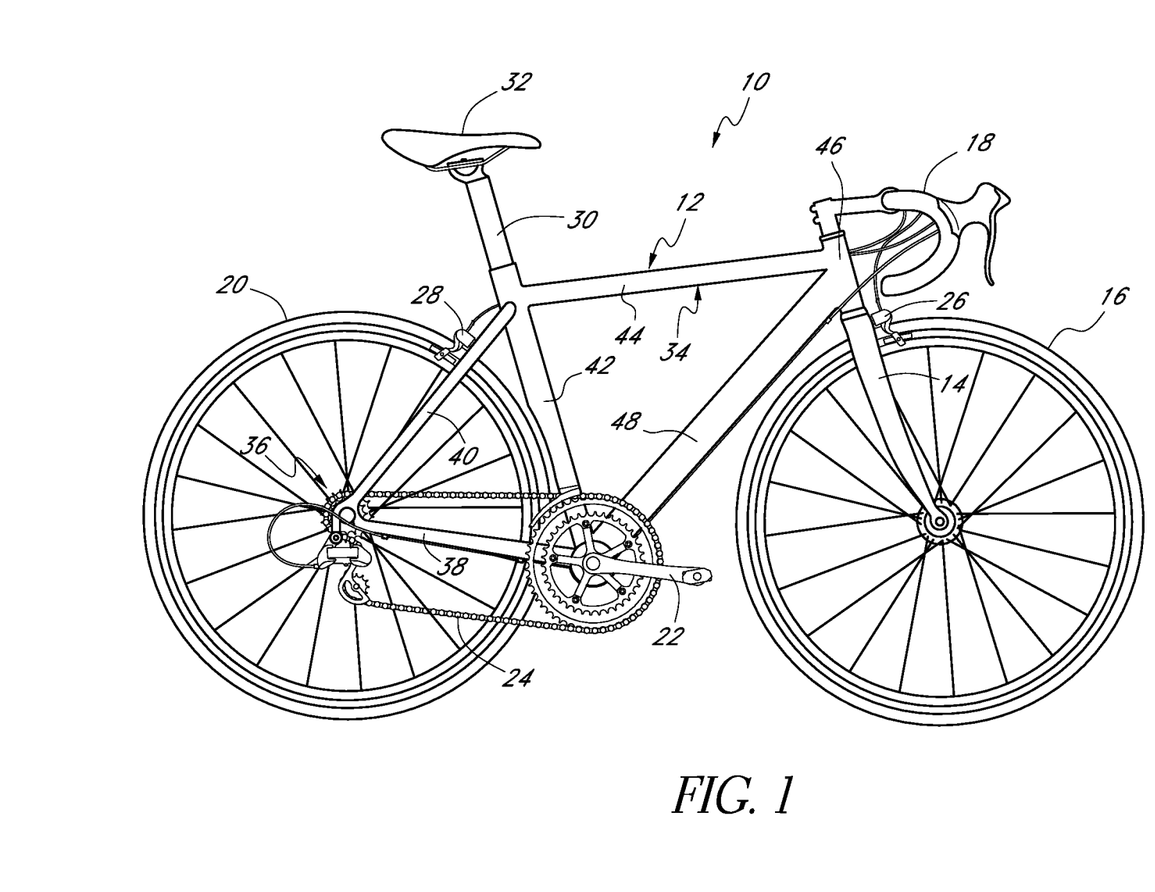
FIG. 1 is a side elevation view of a bicycle.

FIG. 1 illustrates a bicycle, which is referred to generally by the reference numeral 10. The bicycle 10 includes a frame 12, which rotatably supports a wheel support, or front fork assembly 14, near a forward end of the frame 12 for rotation about a steering axis. A lower end of the fork assembly 14 supports a front wheel 16 of the bicycle 10. A handlebar assembly 18 is connected to an upper end of the fork 14 for rotating the fork assembly 14 and front wheel 16 about the steering axis of the bicycle 10. In addition, the handlebar assembly 18 may include one or more rider controls, such as shifting or braking controls.

A rear wheel 20 of the bicycle 10 is supported near a rearward end of the frame 12. A pedal crank assembly 22 is rotatably supported by a lower portion of the frame 12. A drive chain 24 extends between the pedal crank assembly and the rear wheel to transfer power therebetween, as is well known in the art.

A front brake caliper 26 can be supported by the front fork assembly 14 and is configured to selectively apply a squeezing force to a rim of the front wheel 16. Similarly, a rear brake caliper 28 can be supported by the frame 12 and configured to selectively apply a squeezing force to a rim portion of the rear wheel 20. Alternatively, other types of braking systems may also be used.

A seat post 30 extends in an upward direction from the frame 12 and supports a seat 32 on its upper end. The seat post 30 may be adjusted in height relative to the frame 12 to adjust a seat height of the bicycle 10.

Preferably, the frame 12 includes a main frame portion 34 and a wheel support, or rear frame portion 36. The rear frame portion 36 desirably includes a pair of lower legs, or chain stay members 38 (only one shown), extending on each side of the rear wheel 20 from a lower portion of the main frame 34. In addition, the rear frame portion 36 includes a pair of upper legs, or seat stay members 40, extending from an upper portion of the main frame 34 on each side of the rear wheel 20 and being connected to a rear end of the chain stays 38 near a hub axis of the rear wheel 20.

At least the main frame 34 can be constructed from a plurality of tubular, metal pieces welded together. For example, the main frame 34 may be constructed from aluminum, steel or titanium tubing. Alternatively, the frame may comprise a composite material and may be constructed as a unitary piece or multiple pieces bonded or molded together. The frame can be constructed as a composite of a plurality of sheets of a carbon fiber material within an epoxy resin matrix. In addition, other suitable materials and/or construction methods may also be used, as will be appreciated by one of skill in the art.

As can be seen, the main frame 34 can be a triangular main frame. A main frame 34 according to some embodiments comprises a seat tube 42, a top tube 44, a head tube 46 and a down tube 48. The top tube 44 can connect the seat tube 42 and the head tube 46. A seat post 30 with an attached saddle 32 can be installed in the seat tube 42. A steering post or column which connects the handle bars 18 and the fork assembly 14 can be installed in the head tube 46. The down tube 48 can connect a bottom bracket and the head tube 46. A pedal crank assembly 22 can be installed into the bottom bracket. A seat tube 42 can connect the seat post 30 and the bottom bracket. A seat tube 42, according to some embodiments, can connect one end of the top tube 44 with one end of the down tube 48 (as shown in FIG. 1).

As described above, the seat tube 42 preferably is constructed to reduce the amount of vibration passed from the wheels 16, 20 to the saddle 32, and thus to the rider of the bicycle 10.

Figure 2:
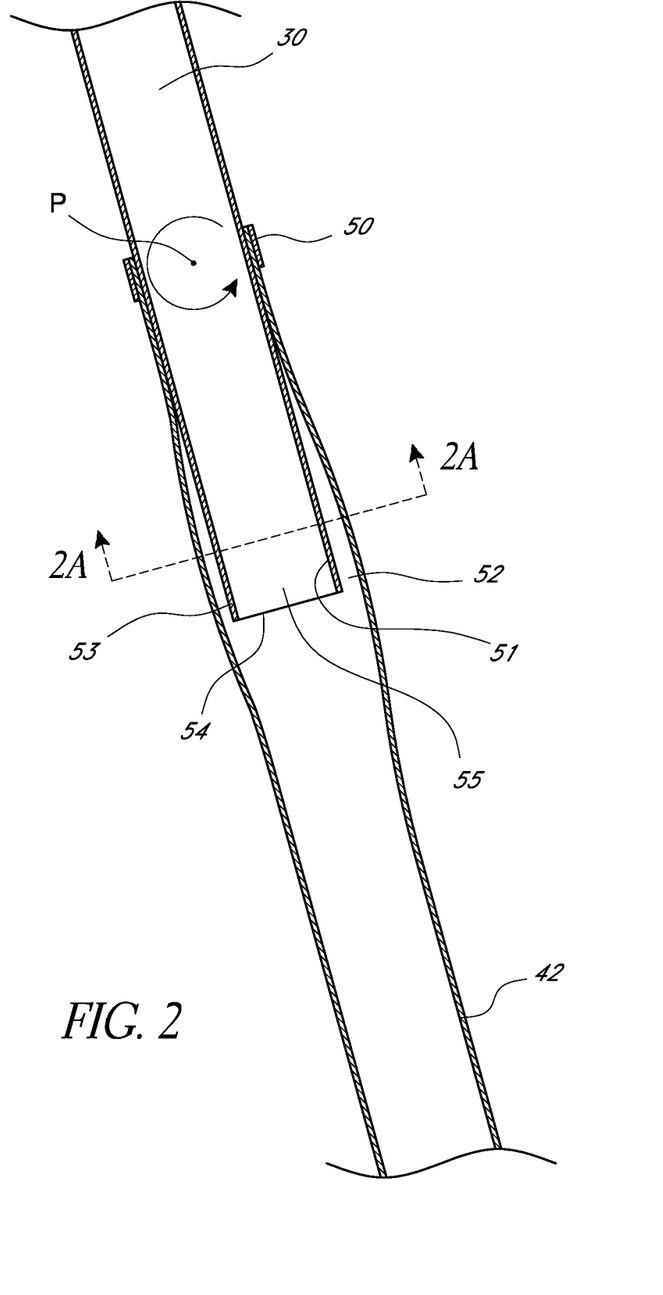
FIG. 2 is a vertical cross-sectional view of a seat tube assembly and seat post.

Referring now to FIG. 2, a seat tube 42 and seat post 30 are shown in cross-sectional view taken along a vertical, longitudinal plane. As used herein, the vertical, longitudinal plane extends along the length of the bicycle 10 and is substantially aligned with a plane defined by the frame 12 and wheels 16, 20. A vertical, lateral plane is substantially normal to the longitudinal plane and a horizontal plane is substantially normal to both the longitudinal and lateral planes. The top tube 44 and seat stays 40 are not shown in FIG. 2, but could be connected at any point to the seat tube 42 such as indicated in FIG. 1.

As illustrated, desirably, the seat tube 42 is of a thin wall, hollow construction to reduce weight. The seat tube or seat tube assembly 42 can be configured to improve rider comfort and vertical compliance of the bicycle frame, which may include vertical and/or fore-and-aft movement of the saddle. For example, as shown in FIG. 2, the seat tube 42 can include an open cavity 52. The open cavity 52 can surround the seat post 30 inside the seat tube 42 below the clamping area. The clamping area being the area around where a clamp or quick release 50, as is known in the art, secures the seat post 30 within the seat tube 42. The clamping area can also be a region around the clamp creating a sufficient contact length between the seat post 30 and the seat tube 42 to secure the seat post at a desired location along the seat tube axis (thereby permitting the seat post 30 to be secured to establish a desired seat height). When a downward vertical load is applied to the saddle 32, movement of the seat post 30 inside the seat tube cavity 52 is minimally restricted allowing the seat post 30 to act as a spring. In some embodiments, the seat tube 42 can comprise a bulge or expanded area and includes the open cavity 52.

A minimum surface contact area between the seat post 30 and seat tube 42 is desirable in the clamping area to prevent the seat post 30 from slipping down, however current bicycle seat posts and clamping systems support the seat post for the entire length of the insertion (the seat tube inner wall contacts the seat post outer wall). These current seat tube/seat post interfaces act as stiff springs that translate vibrations and impacts through the seat tube and seat post to the rider. Normal seat posts do provide some "suspension" or vibration reduction by flexing fore-and-aft. But, the seat post is cantilevered from the seat tube as the inserted portion and seat tube create a stiff double walled reinforcing structure, which limits the flexing of the exposed seat tube portion. The large contact area between the inserted portion of the seat post and the seat tube also transmits vibrations to the rider of the bicycle.

The open cavity 52, as shown in FIG. 2, effectively creates a softer spring system for damping vibrations and impacts which improves the riders comfort, performance, and control. The length of the seat post 30 can flex or rotate about the clamping area to absorb some of the vibrations and impacts. The clamping area creates a virtual pivot point "P" so that the seat post is able to flex and move preferably fore-and-aft or about a lateral axis. Pivot point "P" illustrates one potential virtual pivot point created by the system. Other pivot points and other pivoting directions can also be created depending on the shape of the cavity, and the impact experienced, among other factors.

At least part of the end 54 of the seat post 30 is not in constant contact with the seat tube 42, rather, it is allowed to move as the length of the seat post rotates and flexes and thereby transfers less of the road noise from the wheels to the rider. As at least part of the seat tube and seat post do not create a large double walled, reinforced structure, it can eliminate or reduce the transmission of vibration to the rider.

Figure 2A:
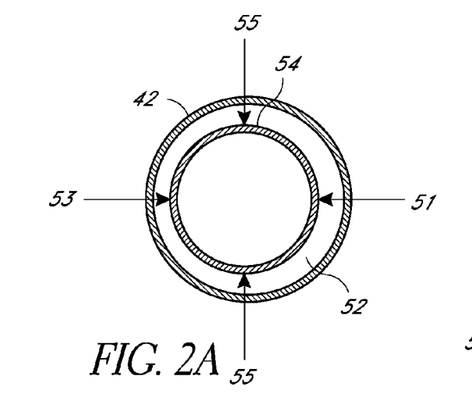
FIG. 2A shows a horizontal cross-section of the seat tube assembly and seat post of FIG. 2 taken along line 2A-2A.

As can be seen, the open cavity 52 can go all the way around the seat tube 42 and can therefore be configured to not contact the end 54 of the seat post 30 (FIG. 2A). In some embodiments, the open cavity 52 can be larger on one side then on the other sides, for example, it can be more open in the front as shown. In some embodiments, the open cavity 52 can be on one or more sides, such as on two or three sides.

Figure 2B:
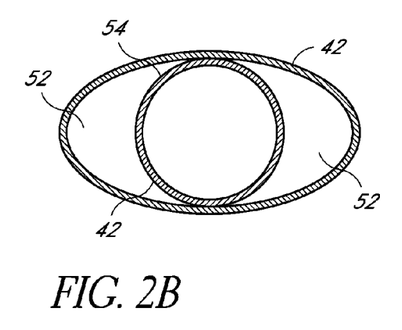
FIGS. 2B-E show horizontal cross-sections of additional embodiments of a seat tube assembly and seat post.
Figure 2C:
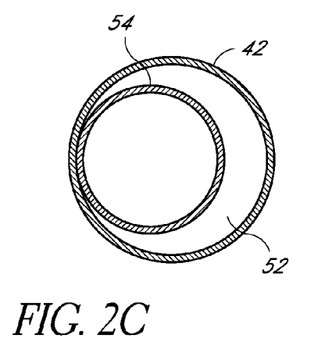
Figure 2D:
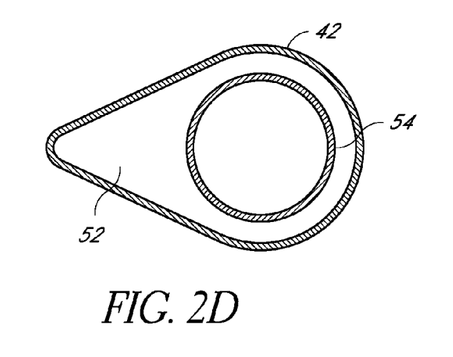
Figure 2E:
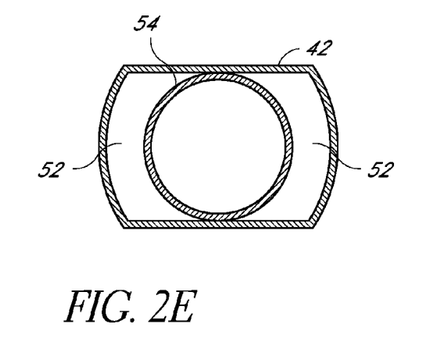

FIGS. 2A-E show various embodiments of a cross-section of a seat post and seat tube assembly. In some embodiments, the front 51 and back 53 of the seat post can be allowed to move. In some embodiments, one or more portion of the seat post can contact the seat tube in an initial state or in a rotated state, for example, the sides 55, or part of the sides (FIGS. 2B, E) or the back 53 (FIG. 2C). The seat tube cross-section can be one of many different shapes, for example, one or more of: circular, oval, elliptical, rectangular, triangular, and/or an airfoil.

The seat tube cross-section can be one of many different shapes and may have a changing cross-section depending upon where the cross-section is taken. For example, the seat tube can have a circular cross-section near the clamp 50 and an oval cross-section at the cavity 52 area (FIG. 2B).

In some embodiments, the open cavity 52 can be relatively small, such that it is not noticeable or barely noticeable to the naked eye. In some embodiments, the open cavity can increase a radius or other dimension of a section of the seat tube 42 by about 1 to 10 mm, or more preferably by about 2 to 4 mm.

The top tube 44 and seat stays 40 are not shown in FIG. 2, but could be connected at any point to the seat tube 42 such as indicated in FIG. 1. For example, the top tube 44 could be connected above, at or below the section of the seat tube including the cavity 52. The seat stays 40 can also be connected above, at or below the section of the seat tube including the cavity 52. In addition, the top tube and/or seat stays can be attached in a manner to span one or more of these sections. For example, an end of the top tube can be flared out or include a flange which increases the surface area of attachment between the tubes.

In these ways and others, the top tube, seat tube and seat stays can be positioned and/or shaped in such a way that the bulge or different shape on the seat tube as a result of the cavity 52 is not noticeable, not as noticeable, is masked and/or hidden.

The seat tube 42 can be one of many shapes. For example it may have a cut out section next to the rear tire 20. The top tube 44 and seat stays 40 can be connected above the cavity region and the seat tube can have a cut out below the cavity region; with this configuration a bulge at the cavity region can be hidden or barely noticeable to the naked eye.

The frame can also include one or more connecting members or tubes. Such a tube can be connected to the top tube and the seat tube, forming a triangle. For example, the top tube could be a sloping top tube that slopes downward to a lower section of the seat tube. A connecting tube can then project upwards from the top tube to the seat tube. This configuration could also be reversed such that the connecting tube projects downwards from the top tube to the seat tube. The multiple connection points can make the change in size at the cavity region difficult to perceive.

Figure 3:
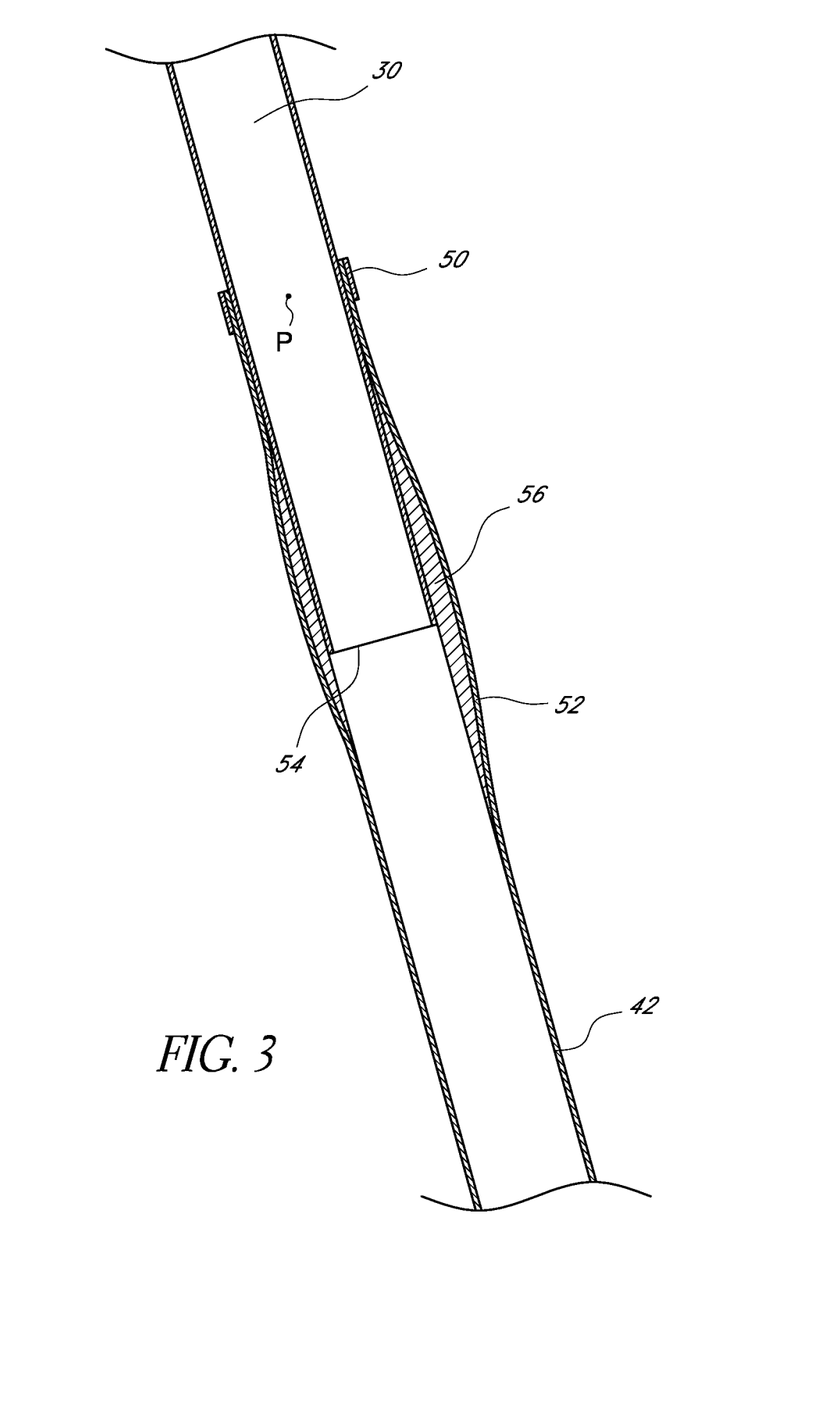
FIG. 3 is a vertical cross-sectional view of another embodiment of a seat tube assembly and seat post.

Turning now to FIG. 3, it can be seen that the seat tube or seat tube assembly 42 can include a damping material 56 within the open cavity 52. The damping material 56 can be an insert, a coating, or an integral piece and can be attached, connected and/or unconnected to the seat tube 42. The damping material 56 can fill all or only part of the open cavity 52. Advantageously, the damping material 56 can provide some support to the seat post 30 while also allowing the seat post to rotate as was discussed previously. The vibration damping material 56 can comprise an elastomeric material. Preferably the elastomeric material comprises a thermoplastic elastomer, and more preferably a viscoelastomeric material In some embodiments, the seat tube assembly 42 can be configured to be adjustable to control the amount of contact and the amount of rotation that can be experienced by the seat post 30 under various conditions. As mentioned previously, the more contact the seat post 30 has with the seat tube assembly 42, the stiffer of a spring it will be. Similarly, the flexibility of the damping material 56 can also determine the stiffness of the spring. In some embodiments, the damping material 56 can be used on less than all sides of the open cavity 52, or as only a thin layer on the open cavity 52. For example, the damping material 56 can be used to reduce possible noise or rattle from the interaction of the seat tube assembly 42 and the seat post 30 at only the back of the seat tube assembly 42.

Figure 4:
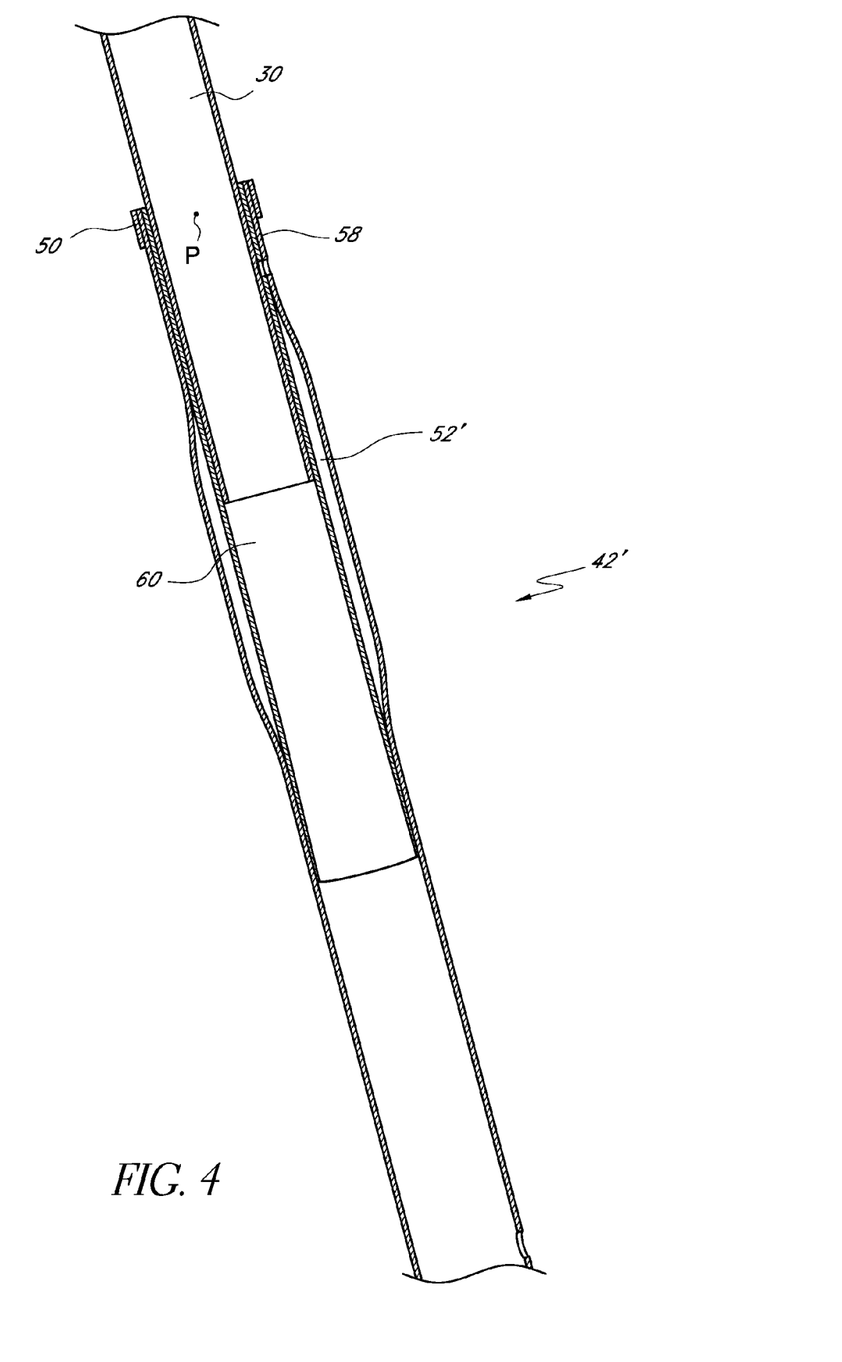
FIG. 4 is a vertical cross-sectional view of another embodiment of a seat tube assembly and seat post.
Figure 5:
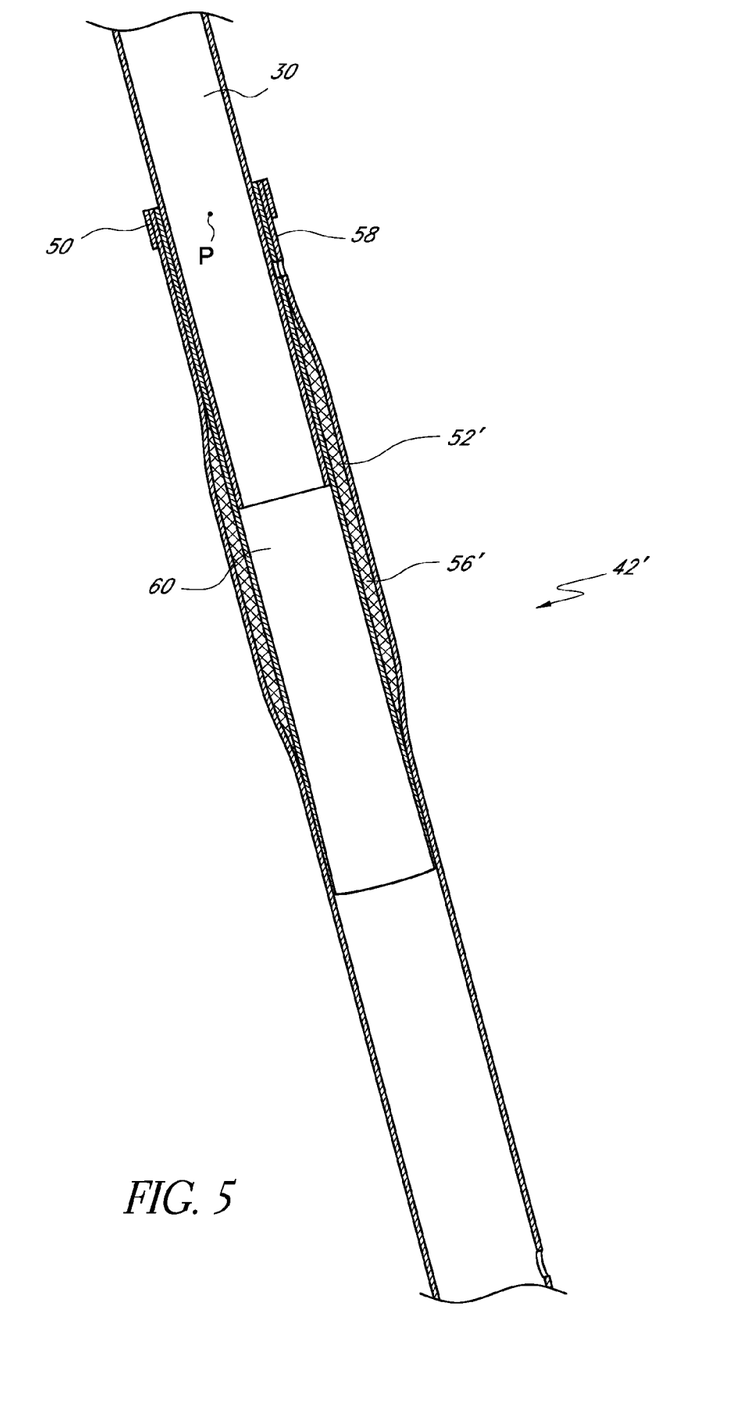
FIG. 5 is a vertical cross-sectional view of another embodiment of a seat tube assembly and seat post.

FIG. 4 shows a seat tube assembly 42' having an outer tube 58 and an inner tube 60. The inner and outer tubes 58, 60 can be made from similar or dissimilar materials and can be the same or different thicknesses. An open cavity 52' can be formed between the inner and outer tubes 58, 60. In some embodiments, the seat tube assembly 42' can also include a damping material 56' as has been described previously (FIG. 5).

In some embodiments, the inner tube 60 can be removable. Thus, the size of the cavity 52' between the inner and outer tube, the thickness of the inner tube 60 and/or the material of the inner tube 60 can be adjustable. In this way a user can adjust the stiffness of the spring created by the seat tube assembly 42' and the seat post 30.

As described herein, the seat tube assembly 42 and seat post 30 can be part of a damping system to influence the vibrations being transmitted to the rider. The embodiments shown enhance vibration damping, while preserving the strength and stiffness of the seat tube assembly 42. Such an arrangement advantageously provides consistent, uniform vibration damping performance of the damping system. Though not shown, other configurations are possible, for example, the relationship of the seat tube and the seat post can be reversed such that the seat post is outside and surrounds an upwardly extending portion of the seat tube. An open space can be formed by the seat post between the seat post and the seat tube.

Of course, the foregoing description is that of certain features, aspects and advantages of the present invention to which various changes and modifications may be made without departing from the spirit and scope of the present invention.

Moreover, a damping system may not feature all objects and advantages discussed above in order to use certain features, aspects and advantages of the present invention. Thus, for example, those skilled in the art will recognize that the invention may be embodied or carried out in a manner that achieves or optimizes one advantage or a group of advantages as taught herein without necessarily achieving other objects or advantages as may be taught or suggested herein. The present invention, therefore, should only be defined by the appended claims.

What is claimed is:

1. A bicycle assembly, comprising:
    a main frame having a top tube, a head tube, a down tube, and a seat tube;
    a seat post comprising first and second ends, the first end configured to connect to a saddle and the second end configured for insertion into the seat tube; and
    a clamp for securing the seat post to the seat tube, at a top end of the seat tube;
    wherein the seat tube is substantially hollow and comprises an inner wall, the seat tube having a first inner dimension at the top end defined by the inner wall that is substantially similar to an outer dimension of an outer wall of the seat post such that the clamp can secure the seat post to the seat tube, the seat tube having a second larger inner dimension below and spaced from the top end, the second larger inner dimension providing a cavity, said cavity defining a space between the outer wall of the seat post and the inner wall of the seat tube below and spaced from the top end of the seat tube, the outer wall being substantially parallel to the inner wall; and
    a damping material within the cavity, wherein the damping material, the seat post, and the seat tube are configured to decrease vibrations transmitted to a rider of the bicycle.

2. The bicycle assembly of claim 1, wherein said damping material is a solid piece of elastomeric material.

3. The bicycle assembly of claim 2, wherein said damping material occupies substantially the entire volume of the cavity.

4. The bicycle assembly of claim 1, further comprising the saddle.

5. The bicycle assembly of claim 1, wherein the clamp comprises a quick release.

6. The bicycle assembly of claim 1, further comprising a front fork, a front wheel and a rear wheel.

7. The bicycle assembly of claim 1, further comprising a front fork.

8. The bicycle assembly of claim 1, wherein the seat post has a substantially constant outer dimension.

9. The bicycle assembly of claim 1, wherein the seat tube has a bulge or expanded area at said second larger inner dimension.

10. The bicycle assembly of claim 1, wherein the cavity extends all the way around the seat tube.

11. The bicycle assembly of claim 1, wherein the cavity is larger on one side as compared to the other sides.

12. The bicycle assembly of claim 11, wherein the cavity is larger in a front side.

13. The bicycle assembly of claim 1, wherein the seat tube has a circular cross-section at said top end and an oval cross-section at said second larger inner dimension.

14. A bicycle assembly comprising:
    a top tube;
    a down tube;
    a head tube connected to said top tube and said down tube;
    a seat tube connected to said top tube and said down tube;
    a fork assembly configured for insertion into said head tube;
    a seat post configured to connect to a saddle at a first end and a second end configured for insertion into said seat tube; and
    a clamp configured to secure said seat post within said seat tube;
    wherein said seat tube is configured to secure said seat post substantially only at the clamp, the seat tube defining a bulge spaced from the clamp, said bulge in the seat tube forming a space between the seat post and the seat tube within said seat tube; and
    a damping member positioned within the seat tube at the bulge and in said space between the seat tube and the seat post.

15. The bicycle assembly of claim 14, further comprising an inner tube configured to fit between the seat post and the seat tube.

16. The bicycle assembly of claim 15, wherein the inner tube comprises an elastomer.

17. The bicycle assembly of claim 14, wherein the clamp comprises a quick release.

18. The bicycle assembly of claim 14, wherein the seat post has a substantially constant outer dimension.

19. The bicycle assembly of claim 14, wherein the cavity extends all the way around the seat tube.

20. The bicycle assembly of claim 14, wherein the cavity is larger on one side as compared to the other sides.

21. The bicycle assembly of claim 14, wherein the seat tube has a circular cross-section at said top end and an oval cross-section at said second larger inner dimension.

22. A bicycle assembly, comprising:
    a main frame having a top tube, a head tube, a down tube, and a seat tube;
    a seat post comprising first and second ends, the first end configured to connect to a saddle and the second end configured for insertion into the seat tube; and
    a clamp for securing the seat post to the seat tube;
    wherein the seat tube comprises a first tube, a second tube, and a cavity, said cavity is located at a position below and spaced away from the clamp, said cavity defines a space between an outer wall of the seat post and an inner wall of the first tube of the seat tube, the cavity positioned at a bulge in the seat tube, the second tube positioned within said first tube and configured to be between the first tube and the seat post, the second tube comprising an elastomer; and
    wherein the seat tube is configured to decrease vibrations transmitted to a rider of the bicycle.

23. The bicycle assembly of claim 22, further comprising a damping material within the cavity.

24. The bicycle assembly of claim 23, wherein said damping material is a solid piece of elastomeric material.

25. The bicycle assembly of claim 22, further comprising the saddle.

26. The bicycle assembly of claim 22, wherein the clamp comprises a quick release.

27. The bicycle assembly of claim 22, further comprising a front fork, a front wheel and a rear wheel.

28. The bicycle assembly of claim 22, wherein the cavity extends all the way around the seat tube.

29. The bicycle assembly of claim 22, wherein the cavity is larger on one side as compared to the other sides.

* * * * *